United States Patent [19]

Pavano

[11] 4,207,135
[45] Jun. 10, 1980

[54] KIT APPARATUS FOR MAKING O-RINGS

[75] Inventor: Robert J. Pavano, Bridgewater, N.J.

[73] Assignee: P.E.P. Associates, Somerville, N.J.

[21] Appl. No.: 809,888

[22] Filed: Jun. 24, 1977

[51] Int. Cl.² ............ B29C 27/06; B65H 69/02; B65H 69/06

[52] U.S. Cl. .................... 156/502; 30/290; 83/762; 83/828; 156/158; 156/159; 156/304.2; 156/228; 156/304.5; 156/510; 156/583.1; 269/9; 269/90; 269/288

[58] Field of Search ............ 156/510, 502, 503, 583, 156/157, 158, 159, 304, 228, 258, 308, 381, 583.1; 269/9, 90, 287, 288, 321 W, 321 WE; 425/108, 394, DIG. 110; 83/581, 821, 827, 828, 762; 30/282, 283, 289, 290, 293

[56] References Cited

U.S. PATENT DOCUMENTS

| 754,078 | 3/1904 | Ludington | 156/158 |
|---|---|---|---|
| 1,013,010 | 12/1911 | Graham | 83/762 |
| 2,402,411 | 6/1946 | Kent | 269/90 |
| 2,514,197 | 7/1950 | Groten et al. | 156/158 |
| 2,521,282 | 9/1950 | Butler | 425/143 |
| 2,680,980 | 6/1954 | Franck | 269/288 |
| 2,688,996 | 9/1954 | Loomis | 156/134 |
| 2,718,255 | 9/1955 | Levin | 156/502 |
| 2,765,837 | 10/1956 | Kenyon | 100/93 P |
| 3,026,569 | 3/1962 | Keller | 156/158 |
| 3,107,393 | 10/1963 | Keller | 118/35 |
| 3,253,972 | 5/1966 | Huddleston | 156/304 |
| 3,341,870 | 9/1967 | Nystrom | 7/163 |
| 3,406,430 | 10/1968 | Furstenburg et al. | 425/215 |
| 3,798,099 | 3/1974 | Marcatili | 156/159 X |
| 3,799,727 | 3/1974 | Howard | 425/394 |
| 3,811,356 | 5/1974 | Wyler | 83/762 |
| 3,929,541 | 12/1975 | Spears et al. | 156/304 X |
| 3,976,534 | 8/1976 | Walter et al. | 156/583 X |
| 4,032,382 | 6/1977 | Obeda | 156/158 X |
| 4,050,975 | 9/1977 | Draffone | 156/217 |

FOREIGN PATENT DOCUMENTS 1552261  1/1969  France .
731605   6/1955  United Kingdom .

Primary Examiner—Michael G. Wityshyn
Attorney, Agent, or Firm—Richard C. Woodbridge

[57] ABSTRACT

A kit for making O-rings from cord stock material essentially includes a holding fixture for securing the material, a container of bonding liquid and a heating mold. The holding fixture allows the cord material to be cut diagonally in such a fashion that the magnitude of the angle is smaller for cord materials having a smaller diameter. Therefore, there is a larger bonding surface for smaller diameter materials. The O-ring heating mold includes two flat separable heat conductive blocks having a common flat interface. Apertures are located across the interface having cross-sectional diameters that are slightly less than the tube stock cross-sectional diameters. Since the central axis of each aperture is not located directly at the interface one portion will include more than 180° of arc whereas the other portion will correspondingly include less than 180°. With this structure it is possible to mate the two O-ring pieces in the heating mold where they will stay relatively immobile until locked in position by a locking screw. A heating control mechanism is associated with a heating element in the heat mold. The kit can be employed to create custom sized O-rings in a relatively short period of time.

28 Claims, 20 Drawing Figures

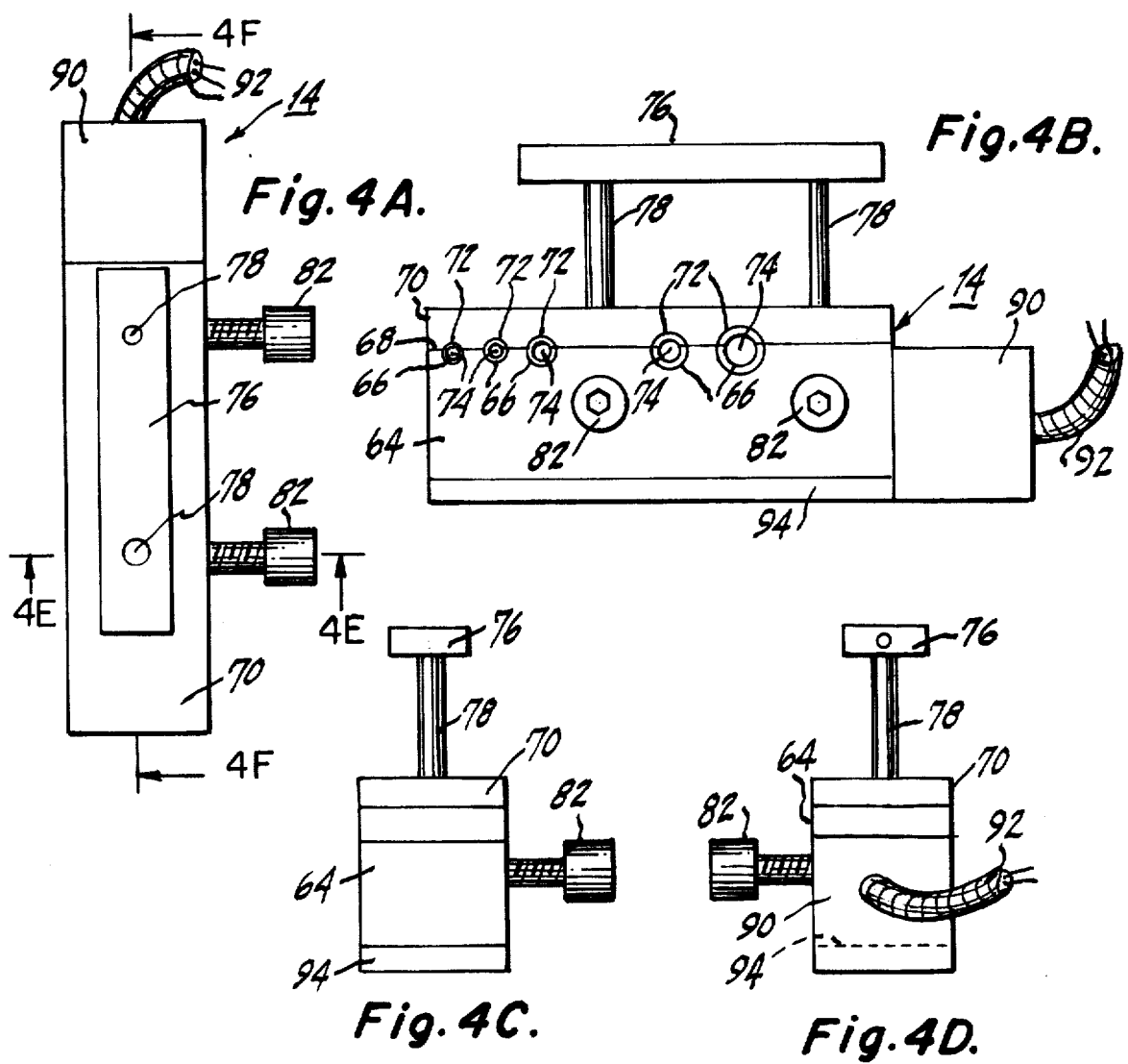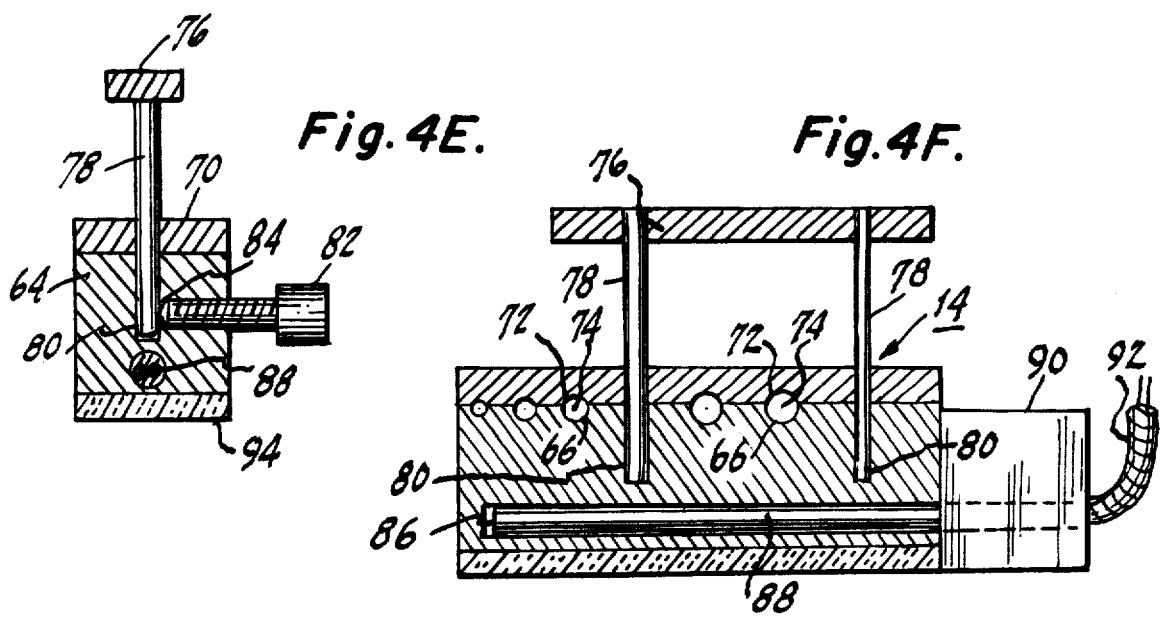

KIT APPARATUS FOR MAKING O-RINGS

BACKGROUND OF THE INVENTION

1. Field of the Invention

This invention relates to a method and kit apparatus for custom manufacturing O-rings from cord stock materials.

2. Description of the Prior Art

There are several apparatuses available for the manufacture of O-rings. For example, there is an "O-Ring Splicing Kit 112" available from the Loctite Corporation of Newington, Conn. That kit is specifically adapted to form O-rings from material such as Buna-N rubber cord. A cord is first placed in a "Loctite ® O-ring splicing fixture" and then cut to the proper length. The splicing fixture is disclosed in U.S. Pat. No. 3,341,870 and U.S. Design Pat. No. 206,551. A thin film of "Loctite quick-set adhesive 404" is then applied to one end of the rubber cord and then the two ends are joined in a special groove in the splicing fixture where they are allowed to set under a small amount of finger pressure. The O-rings formed in that manner are satisfactory for some applications, especially where heat is not a problem. It is believed that the Buna-N rubber is satisfactory for temperatures up to approximately 250° F. For higher temperatures industry frequently uses Viton ® O-rings. Viton ® is a registered trademark of the DuPont Corporation of Wilmington, Del. Viton ® is believed to be acceptable for temperatures in the range of approximately 450°. However, it is difficult to custom form Viton ® in view of the fact that it must be vulcanized. One of the primary purposes of Applicant's invention is to provide a portable device that will allow users to form custom made O-rings from high temperature resistant material such as Viton ®.

A "Method of Fabricating O-Rings" is disclosed in U.S. Pat. No. 3,026,569 to Keller. The method disclosed therein includes the steps of severing a piece of extruded uncured elastomer to a length slightly larger than the circumference of the ultimate O-ring, overlapping the materials and then causing the O-ring to cure in a special mold. The Keller method also specifically discloses the use of a heating mechanism in FIG. 13 thereof which is employed to assist in the vulcanization of the materials.

Another U.S. Pat. No. 3,107,393 to the same inventor discloses a more conventional prior art apparatus and method for fabricating O-rings.

The Sivon Manufacturing Company, Inc. of Perry, Ohio manufactures a customized vulcanizer which can be used to produce O-rings with different characteristics. The device is advertized and sold as a SMACO Model 50 Vulcanizer and can be operated either manually or by a foot pedal. The device apparently can perform the tasks of splicing and embossing as well as vulcanizing. It is noted, however, that the Sivon Vulcanizer is considerably more complicated and bulky than the present invention which is directed more toward emergency situations.

There are many different methods and apparatus for fusing plastic-like materials. See for example, Kenyon, U.S. Pat. No. 2,765,837, Butler U.S. Pat. No. 2,521,282; and Grotten et al U.S. Pat. No. 2,514,197 which disclose prior art methods for fusing such materials under conditions of elevated temperature and pressure. Similar methods are known in the automobile tire manufacturing art. See for example, Ludington, U.S. Pat. No. 754,078 and Loomis, U.S. Pat. No. 2,688,996.

The molding of "gasketing material" into a helical shape is disclosed in U.S. Pat. No. 3,406,430 to Furstenburg et al.

The use of insertable heating elements is known in some arts. For example, Howard, U.S. Pat. No. 3,799,727 discloses a heating mechanism in which the heating elements are adapted to slide in and out of the heating area. The use of an electrical control mechanism for heating elements is also known to those of skill in the art and disclosed in U.S. Pat. No. 3,799,727.

Devices for making diagonal cuts through materials have been known for many years. Miter boxes have been used extensively for the purpose of making diagonal cuts through wood and similar materials. U.S. Pat. No. 3,811,356 to Wyler discloses a "Miter Box of Variable Width". It is similar in a very limited respect to Applicant's cord holding fixture in that the distance between the guides can be adjusted to accomodate materials of different widths. Adjustment in the Wyler device is accomplished in finite steps by placing or removing spacers between the saw guides.

There are several devices available on the market that are suitable for the cutting of O-ring cord stock. For example, the Sivon Manufacturing Co., Inc. of Perry, Ohio manufactures three straight blade cutters for use on cord stocks of Buna-N, Neoprene, Silicone and Viton ®. The three cutters include the "SMACO" Cantilever Cutter, the "SMACO" Pivot Cutter and the "SMACO" Automatic Guillotine Cutter. The foregoing devices are believed to be more complicated and bulky than the cord cutter of the present invention. In addition, guillotine type cutters are dangerous and inadequate for the purpose of marking two diagonal mating cuts simultaneously. It would probably take at least two people to safely make diagonal cuts—one to hold the ends of the cord and one to operate the machine.

SUMMARY OF THE INVENTION

Briefly described the invention comprises a kit apparatus and method for forming O-rings from O-ring cord stock material. Measurements are first taken to determine the length of cord stock necessary to form the ultimate O-ring. A length of material is marked off on the cord stock with an appropriate medium such as white ink. The cord is then severed in such a fashion as to leave about ¼" of excess on the far side of the measuring marks. The cord is then formed into a loop and placed into a cord cutting fixture such that the two measuring marks line up across from one another. The cutting fixture includes a pair of jaws, each of which have a razor guide slot therein. When the cut is made the razor passes through both ends of the cord material simultaneously. Therefore, the diagonal cut made in one end is the supplement of the diagonal cut made in the other. The cutting fixture is such that the diagonal cut made in smaller diameter cord stock is made at a greater angle from the perpendicular than the diagonal cut made through O-ring stock with larger diameters. Bonding liquid is subsequently applied to the two free ends of the O-ring stock which are allowed to dry. As the bonding liquid evaporates, the two ends become tacky. Once this has occurred the two ends are placed in the heating mold such that the faces of the diagonal cuts abut each other. The heating mold includes a plurality of apertures for receiving O-ring stocks of different cross-sectional diameters. The heating mold comprises a first block portion and a second block portion adapted to mate at an interface with the first block portion. The apertures are formed by cylindrical holes bored assymetrically through the interface portion such that the lower block portion has a channel with a partial circular cross-section that is more than 180° of arc and accordingly, the upper block portion has a channel with a partial circular cross-section that is less than 180°. In almost all cases the channel in the lower block includes approximately 300° of arc. Three hundred degrees (300°) is sufficiently great to hold the cord stock material in place before the upper block is mated with the lower block but leave a large enough gap to allow the O-ring to be peeled out after vulcanizing. For smaller diameter cord materials the upper block may have no channels. Therefore, it is possible to thread the two ends of the O-ring stock material into the first block from opposite sides and to hold it there without any additional assistance. In other words, by its construction the lower block prevents the two ends of the cord from becoming displaced. The upper block is then placed in position by a pair of locking bolts. The ends of the O-ring are subsequently heated to approximately 400° F. for 8-15 minutes. After the heating step is completed, the heating mold is removed from the heating element and drenched in an ambient water container. After the mold has cooled the two portions of the mold may be separated and the O-ring peeled out of the channel in the lower block.

These and other features of the invention will be more fully understood with reference to the following drawings:

BRIEF DESCRIPTION OF THE DRAWINGS

FIG. 4A is a top plan view of the heating mold.

FIG. 4B is a side elevational view of the heating mold.

FIG. 4C is a front elevational view of the heating mold.

FIG. 4D is a rear elevational view of the heating mold.

FIG. 4E is a cross-sectional view of the heating mold illustrated in FIG. 4A as seen from perspective 4E—4E.

FIG. 4F is a cross-sectional view of the heating mold illustrated in FIG. 4A as seen from perspective 4F—4F.

DESCRIPTION OF THE INVENTION

During the course of this description, like numbers will be used to indicate like elements in the different views illustrating the invention.

Figure 1:
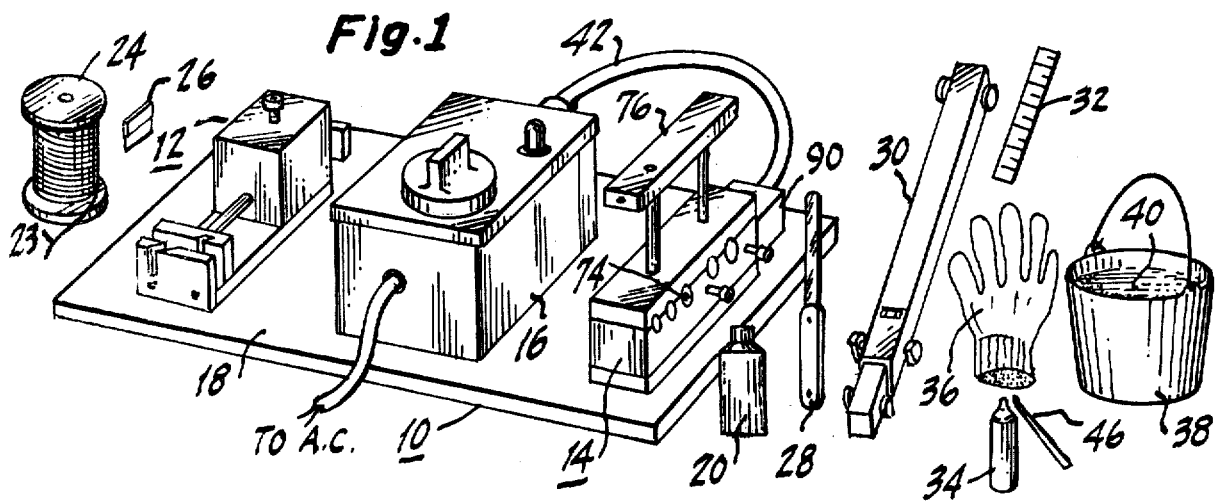
FIG. 1 illustrates the basic elements of the kit apparatus according to the preferred embodiment of the invention.

FIG. 1 illustrates the basic elements of the O-ring kit 10. The basic kit elements include a cord cutting fixture 12, a heating mold 14 and a heating control unit 16. Elements 12, 14 and 16 may be mounted on a baseboard 18 for convenience. The basic kit 10 also preferably includes a pressurized container of bonding liquid 20. There are a variety of other elements which are useful in practicing the method of the invention, but which may or may not be part of the kit package at the option of the kit manufacturer. Those optional elements include a supply of O-ring cord material 23 which may be mounted on a spool 24, a cord cutting razor 26, a spatula 28, an O-ring gauge 30 and/or an O-ring measuring ruler 32, a bottle of white ink 34 and a marking pen 46 for marking the cord material, a heat protective glove 36 and a small bucket or pail 38 for holding the water 40 used in the quenching of heating mold 14.

The steps involved in making the O-ring from the elements illustrated in FIG. 1 are set forth in FIGS. 2A-2H. It is frequently desirable to custom make O-rings under emergency circumstances. Typically, there might be an O-ring failure and insufficient time to purchase a new one. Therefore, the first step of the present invention is to determine the size of the O-ring to be manufactured or replaced. If an O-ring is to be replaced its cross-sectional diameter can be measured either with a gauge 30 or with an appropriate pair of calibers. The ultimate circumferential length of the O-ring can likewise be determined by the use of an appropriate gauge 30 or it may be determined mathematically by measuring the diameter of the O-ring seat and then multiplying by 3.14 to determine the length of the circumference.

Figure 2A:
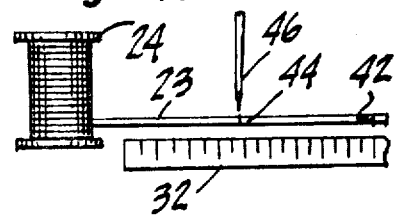
FIGS. 2A through 2H illustrate the steps performed in the making of an O-ring using the elements illustrated in FIG. 1.
Figure 2B:
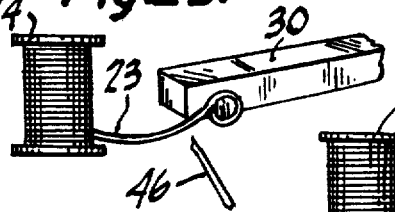

FIG. 2A illustrates a conventional method for measuring and marking the O-ring cord stock. FIG. 2B illustrates an acceptable alternative method for measuring and marking the O-ring stock. According to FIG. 2A, the circumferential length of the O-ring has been predetermined mathematically and two white ink marks 42 and 44 are placed on the cord material 23 by marking pen 46. It is preferable to then cut the cord and leave an additional ⅛" of excess material at each end of the cord for insertion into the cutting clamp. Alternatively, as shown in FIG. 2B, if the O-ring is of a conventional size, the cord material may be measured and marked directly on the O-ring gauge 30. O-ring gauges are available on the market for the purpose described above. One is commercially known as the "National O-Ring Gauge" manufactured by the Federal-Mogul Corporation, Detroit, Mich. Again, if the cord 23 is severed an additional ⅛" of excess material should be left on the outside of the measuring marks 42 and 44. As a third alternative, it may be possible to measure the required length of O-ring stock directly around a shaft. If so, the same procedures are followed as are set forth above with regard to the steps in FIGS. 2A or 2B.

Figure 2C:
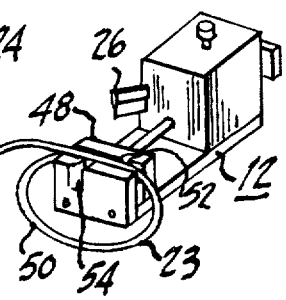
Figures 3A, 3B:
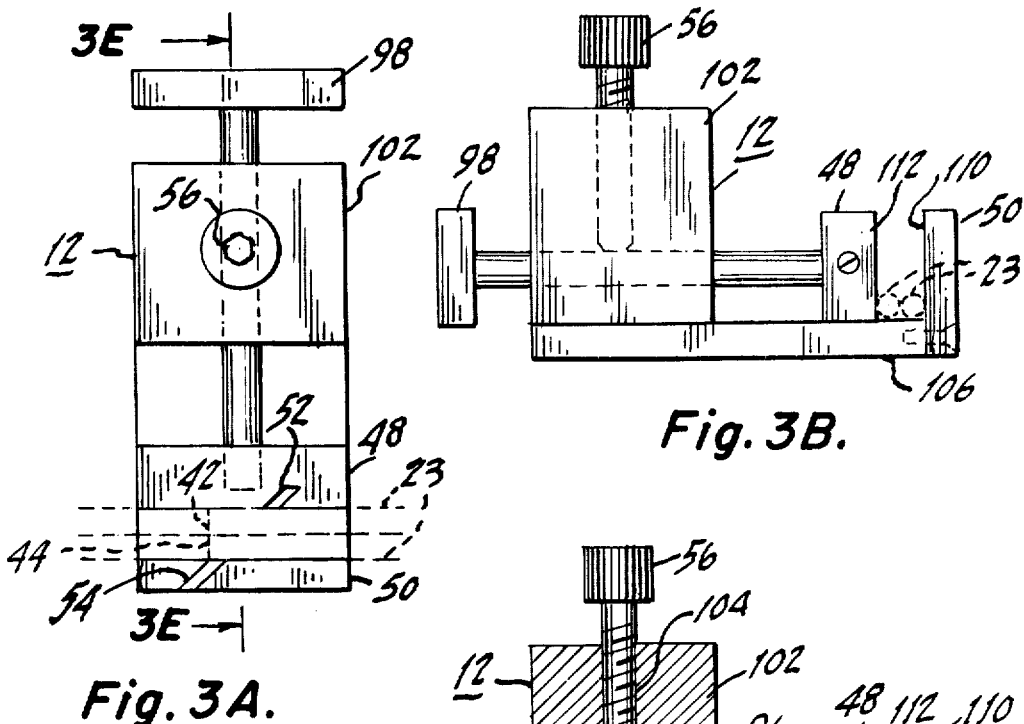
FIG. 3A is a top plan view of the O-ring cord cutting fixture.
FIG. 3B is a side elevational view of the cutting fixture.
Figure 3E:
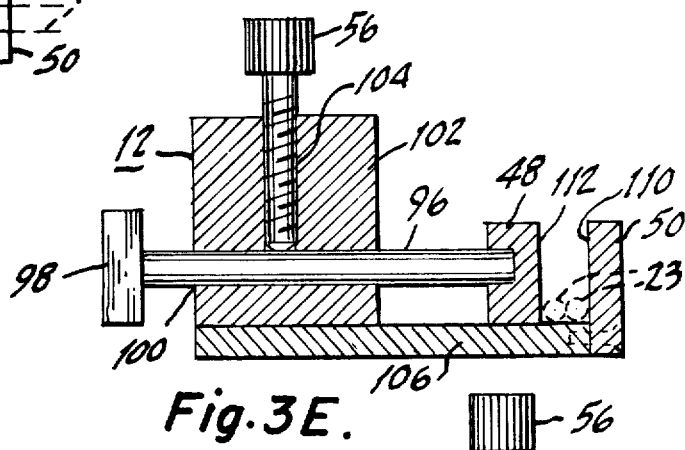
FIG. 3E is a cross-sectional view of the cutting fixture illustrated in FIG. 3A as seen from perspective 3E—3E.
Figures 3C, 3D:
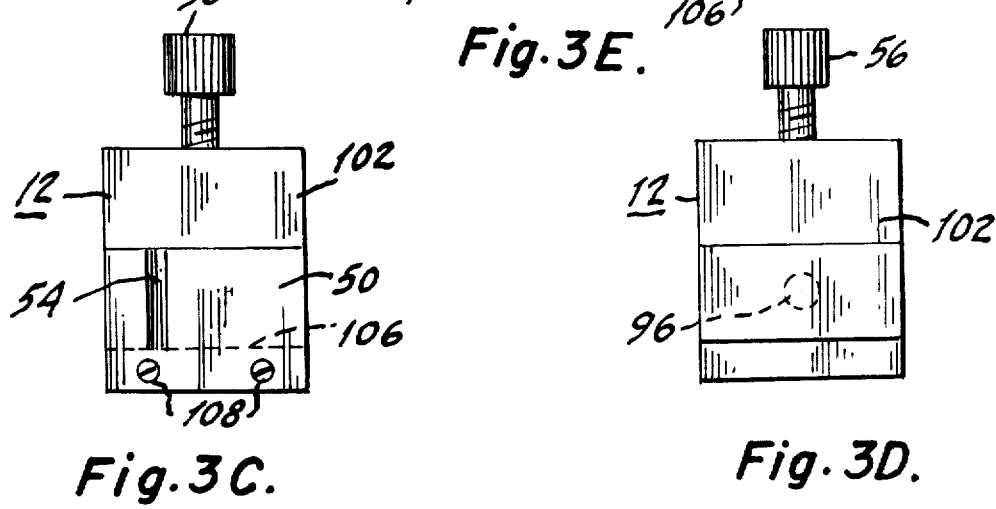
FIG. 3C is a front elevational view of the cutting fixture.
FIG. 3D is a rear elevation of the cutting fixture.

The marked length of cord stock material 23 is then inserted into cord cutting fixture 12 as shown in FIG. 2C. The cord 23 may or may not be severed from the cord spool 24 at the convenience of the operator. When inserted into the cord cutting fixture the cord material 23 is formed in a circle and laid between the jaws 48 and 50 of the fixture in such a fashion as to assume a side-by-side relationship. The white ink marks 42 and 44 are lined up directly across from one another so that the loop formed by the cord 23 is approximately the size of the ultimate O-ring. The relationship of the two ends of the cord in position in fixture 12 is illustrated in FIGS. 3A, 3B and 3E. The cord cutting fixture 12 includes a cutting guide for guiding the razor 26 through the O-ring cord material 23. The guide comprises a notch 52 in jaw 48 and a slot 54 in jaw 50. Jaw 48 can be adjusted to push the two cord ends together against jaw 50. Jaw 48 may be locked in its position by means of locking screw 56. Finger pressure may be employed to flatten the two ends of the cord material 23 and keep them parallel to the base 56 of the cutting fixture prior to the cutting step. The cutting step is performed by placing razor 26 into slot 54 and notch 52 and then drawing razor 26 through the two ends of the cord material 23 simultaneously so as to make one clean cut. One important feature of the invention is the ability of the cord cutting fixture 12 to adjust the angle of the diagonal cut to suit the diameter of the specific materials being used. On O-rings having small cord diameters, it is preferable to make the diagonal cut in such a fashion as to expose a relatively large cut face. This is necessary to provide a larger bonding surface and therefore give added strength to the ultimate product. Conversely, if the O-rings have a relatively large cord diameter then it is more desirable to make the diagonal cut closer to a direction that is perpendicular to the length of the cord material. The cord cutting fixture 12 automatically adjusts for cord materials of different diameters so that the bigger diameter cords are cut at an angle closer to a direction perpendicular to the length of the cord and the smaller diameter cord materials are diagonally cut in a direction that is more parallel to the length of the cord. This automatic feature is available because the larger cord diameter materials force adjustable jaw 48 further away from fixed jaw 50. Slot 54 and notch 52 are sufficiently wide enough to accomodate the razor blade 26 at a wide variety of angles. Notch 52 acts like a pivot point around which the blade 26 may rotate. Accordingly, slot 54 is wider than notch 52.

Figure 2D:
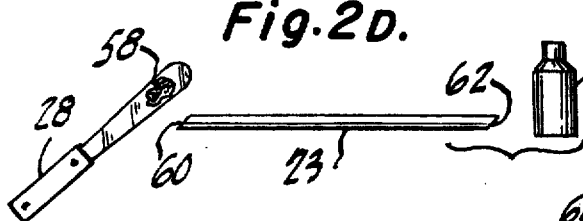

Once the cord 23 is cut to size, a bonding liquid 58 is applied to the diagonally cut free ends 60 and 62 as shown in FIG. 2D. The bonding liquid 58 is commercially available in aerosol containers 20. A suitable bonding liquid is commercially known as PLV-2000 and is manufactured and distributed by Pelmor Laboratories, Inc., Lafayette Street, Newton, Pa. In order to apply the bonding liquid 58 to the free ends 60 and 62 of the cord, a dime size bubble is first sprayed onto the blade of a spatula 28 or other similar clean surface. Both ends 60 and 62 are then dipped into the bubble 58 and allowed to dry. As the drying takes place the Viton ® changes from a glossy appearance to a rather dull sheen. That indicates that the solvent has substantially evaporated. At that point the two ends are slightly tacky.

Figure 2E:
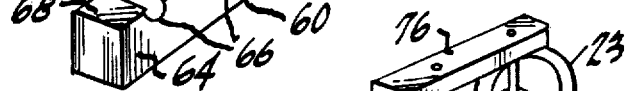

As shown in FIG. 2E the two ends 60 and 62 are then mated in the lower block 64 of the heating mold 14. Due to the manner in which the cord material 23 was severed in cutting fixture 12, the two ends 60 and 62 are of supplementary geometry. The lower block 64 includes a plurality of molding channels 66. The molding channels 66 comprise a portion of a cylindrical hole and have a cross-section that bisects more than 180° of the circle. Therefore, the widest portion of the channel 66 is below the interface surface 68 of the lower block 64. Accordingly, when the two tacky ends 60 and 62 are mated in a groove 66, the material tends to stay in place prior to the heating step.

Figure 2F:
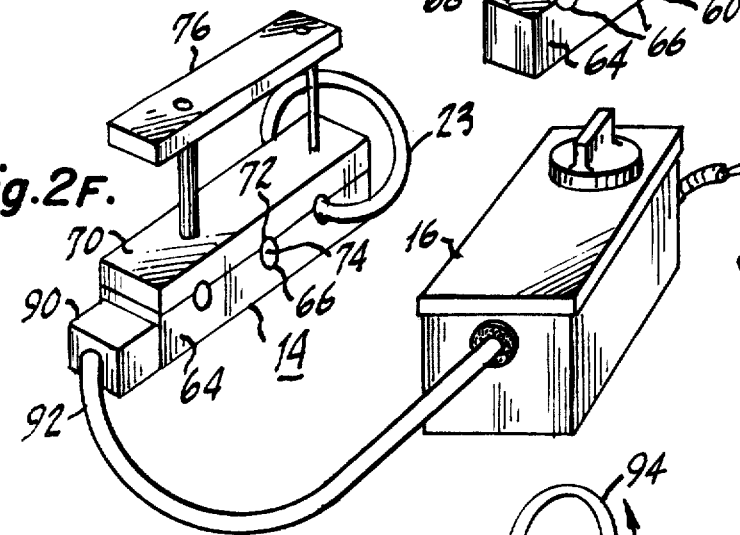

Once the two ends 60 and 62 are in position, the heating mold 14 is ready to be sealed. This is accomplished by placing the upper plate or block 70 in position as illustrated in FIG. 2F. The upper block 70 typically includes a plurality of upper channels 72 which complement the lower channels 66 in the lower block 64. The upper channels 72 have a cross-section which is less than 180° of a circle and therefore, they are widest at the interface surface 68. For the smaller diameter cord stock materials there may be no need for an upper channel 72. The apertures 74 formed by grooves 66 and 72 are not perfectly round in cross-section. During the manufacture of the heating mold 14 in the apertures 74 are formed by assymetrically drilling cylindrical holes across the interface 68 of the two blocks 64 and 70. The holes are approximately the diameter of popular O-ring stock materials. The interface of the upper block 70 is then ground down approximately 0.010 to 0.012 of an inch. Therefore, the ends 60 and 62 of the cord material 23 are placed under compression when the upper block 70 is placed in position over lower block 64. The upper block 70 is separated from its handle 76 by a pair of standoff pins 78. The pins 78 extend through the block 70 and are adapted to be received in guide pin holes 80 in the lower block 64. A pair of locking bolts 82 are located in a threaded passageway 84 and adapted to impinge against the pins 78 when they are in position in guiding holes 80. In this manner the upper plate 70 may be locked with respect to the lower plate 54. Lower block 64 includes a cavity 86 adapted to receive a heater element 88. The heater element 88 is mounted on a block 90 and is electrically attached via cable 92 to the heat control unit 16. Heating mold 14 sits on top of a heat resistant asbestos-like pad 94. Heating element 88 is loosely received in aperture 86 so that it is readily possible to slide the heating mold 14 off of pad 94 and out of contact with the heating element 88 after the heating step has been performed.

The heater control 16 and the heating element 88 were both manufactured by Waage Electric, Incorporated of Kenilworth, N.J. The Element was a 120 volt A.C. 100 watt cartridge heater having a ⅜" diameter and a length of 3". The control unit was a Model INF 120. The control unit is apparently equipped with an automatic mechanism for limiting the power to the heater element once the heater element has reached the desired temperature corresponding to a specific control setting.

The heating of the material 23 is accomplished after the upper block 70 is locked in position and the lower block 64 is in engagement with the heating element 88 as shown in FIG. 2F. The heating takes place at two settings. First, the heater control 16 is set on high for a period of seven minutes. This rapidly brings the temperature up to approximately 400° F. The control is then set to a setting of 5½ for 8 minutes which maintains the heat at 400° F. under controlled conditions for a total of 15 minutes. After 15 minutes, the heater control unit 16 is turned off and the mold 14 is slid across pad 94 and away from heating element 88. It is advisable to wear a pair of heat protective gloves 36 as illustrated in FIG. 1 when working with the heating mold.

Figure 2G:
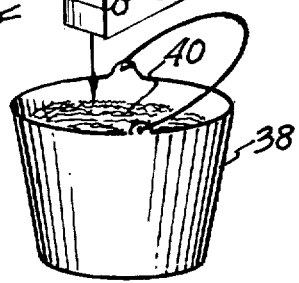

The heating mold 14 is then inserted into a small bucket 38 or a similar container of ambient water 40 as shown in FIG. 2G. The O-ring and heating mold 14 is then allowed to cool until it reaches approximately room temperature. Cooling takes about 30 seconds when room temperature water is used. After cooling the heating mold 14 may be removed. Rapid quenching of the mold is not a necessary step but it does expedite the manufacture of the O-ring.

Figure 2H:
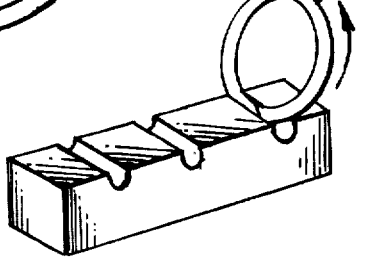

Heating mold 14 is dissassembled by loosening locking screws 82 and removing the upper block 70 from the lower block 64. The O-ring 94 may then be removed from lower channel 66. This is accomplished by simply peeling the O-ring across the lower channel 66 from one side of the lower block 64 towards the other as shown in FIG. 2H. The custom made O-ring 94 is now ready for use.

Cord cutting fixture 12 includes a locking screw 56 which immobilizes the adjustable jaw 48 when jaw 48 is in position with respect to fixed jaw 50. Lower jaw 48 is connected by a shaft or rod 96 to a handle plate 98. Shaft 96 passes through an aperture 100 in locking block housing 102. Locking screw 56 is likewise situated in a threaded aperture 104 which is at right angles to and in communication with aperture 100. Accordingly, the adjustable jaw 48 may be locked in position by screwing locking screw 56 downwardly against shaft 96. Conversely the position of locking jaw 48 may be unlocked by screwing the locking screw upwardly out of the threaded aperture 104. The fixed front plate 50 is attached to the base 106 by a pair of machine screws 108. In a similar manner the locking block housing 102 may be attached to base 106.

Slot 50 and notch 52 are approximately ⅛" apart when the adjustable jaw 48 is pushed into an abutting relationship with fixed jaw 50. Slot 54 is approximately ⅛" wide and positioned at an angle of approximately 30° with respect to the plane of its inner face 110. Notch 52 is approximately 1/16" wide and situated at an angle of approximately 45° with respect to the inside face 112 of the adjustable jaw 48. As described previously, there has to be sufficient play in the slot 54 and the notch 52 to allow the razor 26 to adjust to a variety of cord sizes without binding on the sides of the jaws. The cord cutting fixture 12 may be secured to base 18 by any of a variety of conventional attaching devices, including screws, bolts, and glues and adhesives.

Heating mold 14 preferably includes two guide pins 78. At least two guide pins are preferable so as to stabilize the mold in two dimensions. It may also be desirable to have one guide pin 78 of a different diameter than the other guide pin 78 so that it is impossible to misalign the mold by reversing the guide pins.

The receiving apertures 14 are formed by drilling directly across interface 68. The center of the axis of the aperture is located below interface 68 in the lower block 64. In smaller cord sizes the cord tolerance is ±0.003 inches and for larger sizes the cord tolerance is approximately ±0.006 inches. It is desirable to leave an additional 0.002 inches of diameter in each aperture to more readily allow the cord material to be inserted. Therefore, for smaller size cord stocks the apertures are equal to the nominal diameter of the cord stock material plus 0.003 inches plus an additional 0.002 inches or a total of 0.005 inches above the nominal size. For large size cord stock materials the apertures are equal to the nominal cord stock diameter plus 0.006 inches plus an additional 0.002 inches or a total of 0.008 inches greater than the nominal cord size. After the drilling operation the face of the upper plate 70 is ground down approximately 0.010" to 0.012". Accordingly, the cross-section of the aperture 74 is not a true circle but rather comprises two sections of a circle sandwiched together, the total number of degrees eclipsed by both sections totalling less than 360° of the original circle. The grinding operation effectively removes some of the volume of the originally cylindrical aperture. In almost all cases the channel in the lower block includes approximately 300° of arc. The channel in the upper block is, therefore, typically less than 60° of arc after the grinding step. Since the original cylindrical aperture was just slightly larger than the diameter of the O-ring cord, the final aperture after grinding is slightly smaller than the diameter of the O-ring cord. Therefore, when upper plate 70 is locked in position with respect to lower block 64, there is compression upon the ends 60 and 62 of the cord during the heat vulcanizing process. Apertures 74 are slightly countersunk at both ends so as to create a flared opening at both ends. The flared openings make it easier to insert the free ends 60 and 62 into the lower block prior to heating.

Upper block 70 and lower block 64 are preferably formed from aluminum in order to assure rapid heating and cooling. Aluminum also rusts less and is relatively easy to machine. The guide pins 78 and locking screws 82 may be steel.

The heating control unit 16 is a conventional adjustable rheostat or transformer or the like with sufficient capacity to drive the heating element 88. A variety of suitable heat control units 16 and heating elements 88 are believed to be available and suitable for the purposes described herein.

While the invention has been described with reference to a preferred embodiment thereof, it will be apparent to those of ordinary skill in the art that various different changes can be made in the apparatus and method without departing from the spirit and scope of the invention. For example, it has been disclosed that the invention is particularly adapted for the use in the making of Viton ® O-rings. Clearly other types of standard cord stock such as Buna-N, Neoprene, and Silicone could be manufactured into O-rings by essentially the same method and apparatus. The bonding liquid 20 is available in an aerosol form from Pelmor Laboratores in Newton, Pa. The material could be supplied in a liquid form as well as an aerosol form. Other solvents such as methyl ethyl ketone (MEK) may be employed for the same purpose. A suitable sharp edge or even a rotating blade could conceivably replace the razor blade 26. Spatula 28, glove 36 and white ink 34 along with applicator 46 have been found to be convenient elements, but not absolutely necessary under all circumstances. Other methods and apparatus for measuring the O-ring cord material are possible. The heating mold 14 has been illustrated with five different size receiving apertures 74. Clearly, a greater or smaller number of receiving apertures could be employed depending upon the requirements of the user.

I claim:

1. A kit for making O-rings from flexible, elastic O-ring cord stock material, said kit comprising:
   a continuously adjustable holding means for clamping and locking two portions of a continuous piece of said flexible, elastic O-ring cord stock material in side-by-side relationship so that said continuous piece of cord material can be simultaneously cut at two different locations into a predetermined length having two diagonally cut and exactly complementary matching free butt ends, said holding means further including means for making the angle of said cut more perpendicular to the length of said cord stock material for cord stock materials of larger diameter than for cord stock materials of smaller diameter;
   a bonding liquid for application to said two free butt ends; and,
   a mold means for completely surrounding said two free butt ends by 360° and for heating said two free butt ends and causing said butt ends to bond to each other, said mold means including means for temporarily holding said two free butt ends prior to complete surrounding and heating of said two free butt ends in said mold means.

2. The kit of claim 1 wherein said adjustable holding means includes a diagonal guide means for guiding a cutting blade through said cord stock material.

3. The kit of claim 2 wherein said adjustable holding means includes:
   a base;
   a first jaw attached to said base, said first jaw including a first cutting blade guide slot means therein; and,
   a second jaw attached to said base and displaceable with respect to said first jaw, said second jaw including a second cutting blade guide slot means therein adapted to cooperate with said first guide slot means in said first jaw.

4. The kit of claim 3 wherein said first and said second jaws include opposing faces which are vertical with respect to the plane of said base.

5. The kit of claim 4 wherein said second jaw includes a shaft connected thereto.

6. The kit of claim 5 wherein said adjustable holding means further includes:
   a housing means connected to said base, said housing means having a first aperture therethrough adapted to receive said shaft.

7. The kit of claim 6 wherein said adjustable holding means includes:
   a locking means for locking said second jaw relative to said first jaw.

8. The kit of claim 7 wherein said housing means includes a second aperture therein which communicates with said first aperture and is substantially perpendicular thereto.

9. The kit of claim 8 wherein said second aperture includes screw threads therein and,
   said locking means comprises a threaded bolt receivable in said second aperture and adapted to impinge upon said shaft.

10. The kit of claim 1 wherein said mold means comprises:
    a first heat conductive means;
    a second heat conductive means adapted to meet at an interface with said first heat conductive means;
    at least one cord stock material receiving aperture located across said interface; and,
    a heating element means for heating said mold means.

11. The kit of claim 10 wherein the cross-section of the portion of the cord receiving aperture included in one of the heat conductive plates is approximately 300° of arc.

12. The kit of claim 11 wherein said first heat conductive means includes at least one guide pin therein; and,
    said second heat conductive means includes a first aperture therein for receiving said guide pin.

13. The kit of claim 12 wherein said second heat conductive means includes a locking means for locking said first heat conductive means in position relative to said second heat conductive means.

14. The kit of claim 13 wherein said second heat conductive means includes a second aperture therein which communicates with said first aperture and is substantially perpendicular thereto, said second aperture including screw threads therein; and,
    said locking means comprises a threaded bolt receivable in said second aperture and adapted to impinge upon said guide pin.

15. The kit of claim 14 further including:
    a handle means connected to said first heat conductive means.

16. The kit of claim 15 wherein said second heat conductive means comprises a block of heat conductive material and further includes an opening therein for receiving said heating element means.

17. The kit of claim 16 wherein said mold means includes a plurality of cord material receiving apertures.

18. The kit of claim 17 wherein said first heat conductive means includes an additional guide pin; and,
    said second heat conductive means includes an additional guide pin receiving aperture and an additional locking means for locking said additional guide pin in position.

19. The kit of claim 18 further including:
    a control means for controlling the temperature of said heating element means.

20. A holding apparatus for holding flexible, elastic O-ring cord stock material, said apparatus comprising:
    a base;
    a first jaw attached to said base, said first jaw including a first cutting blade guide slot means therein;
    a second jaw attached to said base and displaceable with respect to said first jaw, said second jaw including a second cutting blade guide slot means therein adapted to cooperate with said first guide slot means in said first jaw, said first and second jaws defining a gap therebetween having sufficient size to accomodate and clamp two portions of said flexible, elastic O-ring cord stock material in a side-by-side relationship while both portions lie in contact with said base, said first and second jaws including opposing faces which are substantially vertical with respect to the plane of said base;
    a shaft connected to said second jaw;
    a housing means connected to said base, said housing means having a first aperture therein adapted to receive said shaft; and,
    a continuously adjustable means for locking said second jaw relative to said first jaw and clamping said flexible, elastic O-ring cord stock material between said first jaw and said second jaw,
    wherein a cutting blade may be accomodated in said first and second cutting blade guide slot means to cut said cord stock material so that the angle of said cut is continuously and progressively more perpendicular to the length of said cord stock material for cord stock materials of larger diameter than for cord stock materials of smaller diameter and so that a single cut of said cutting blade provides two exactly complementary matching free butt ends.

21. The apparatus of claim 20 wherein said housing means includes a second aperture therein which communicates with said first aperture and is substantially perpendicular thereto.

22. The apparatus of claim 21 wherein said second aperture includes screw threads therein and,
    said locking means comprises a threaded bolt receivable in said second aperture and adapted to impinge upon said shaft.

23. A mold apparatus for heating flexible, elastic O-ring cord stock material, said apparatus comprising:
    a first heat conductive means;

a second heat conductive means which forms an interface with said first heat conductive means and makes contact with said first heat conductive means when in use;

a plurality of material receiving apertures located across said interface, said apertures having dimensions sufficient to surround two portions of flexible, elastic O-ring stock material in a butt-to-butt relationship by 360°;

a heating element means for heating said mold apparatus;

at least one guide pin attached to said first heat conductive means;

at least a first aperture in said second heat conductive means for receiving said guide pin; and, a locking means included in said second heat conductive means for locking said first heat conductive means in contact with said second heat conductive means, wherein the cross-section of at least one of said material receiving apertures included in one of said heat conductive means is approximately 300° of arc.

24. The apparatus of claim 23 wherein said second heat conductive means includes a second aperture therein which communicates with said first aperture and is substantially perpendicular thereto, said second aperture including threads therein; and, said locking means comprises a threaded bolt receivable in said second aperture and adapted to impinge upon said guide pin.

25. The apparatus of claim 24 further including:

a handle connected to said first heat conductive means.

26. The apparatus of claim 25 wherein said second heat conductive means comprises a block of heat conductive material and further includes an opening therein for receiving said heating element means.

27. The apparatus of claim 26 wherein said first heat conductive means includes an additional guide pin; and, said second heat conductive means includes an additional guide pin receiving hole and an additional locking means for locking said additional guide pin in position.

28. The apparatus of claim 27 further including:

a control means for controlling the temperature of said heating element means.

* * * * *